United States Patent
Chen et al.

(10) Patent No.: US 7,437,172 B2
(45) Date of Patent: Oct. 14, 2008

(54) DISCONTINUOUS TRANSMISSION (DTX) DETECTION IN WIRELESS COMMUNICATION SYSTEMS

(75) Inventors: Qingxin Chen, Del Mar, CA (US); Shimman Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 440 days.

(21) Appl. No.: 10/316,760

(22) Filed: Dec. 10, 2002

(65) Prior Publication Data

US 2004/0203463 A1     Oct. 14, 2004

(51) Int. Cl.
  *H04B 7/00*  (2006.01)
(52) U.S. Cl. ............ 455/522; 455/69; 455/67.13; 370/318
(58) Field of Classification Search .......... 455/67.1, 455/522, 67.13, 282, 69, 70, 63.1, 456.4; 370/318

See application file for complete search history.

(56) References Cited

U.S. PATENT DOCUMENTS

| | | | |
|---|---|---|---|
| 5,056,109 A | 10/1991 | Gilhousen et al. | |
| 5,265,119 A | 11/1993 | Gilhousen et al. | |
| 6,370,392 B1 | 4/2002 | Li et al. ................ | 455/522 |
| 6,725,054 B1 * | 4/2004 | Hwang et al. ........... | 455/522 |
| 6,728,551 B2 * | 4/2004 | Chang ................. | 455/522 |
| 6,731,948 B1 * | 5/2004 | Lee et al. .............. | 455/522 |
| 2002/0086692 A1* | 7/2002 | Chheda et al. .......... | 455/522 |
| 2003/0142728 A1* | 7/2003 | Lin .................. | 375/147 |
| 2004/0095918 A1* | 5/2004 | Dominique et al. ...... | 370/342 |

FOREIGN PATENT DOCUMENTS

| | | |
|---|---|---|
| WO | 0101610 | 1/2001 |
| WO | 0203588 | 1/2002 |

OTHER PUBLICATIONS

Yiping Wang et al: "Power control methods for dedicated control channels during discontinuous transmission in IS-2000 systems"; IEEE International Symposium on Personal Indoor and Mobile Radio. Vo. 1, Sep. 18, 2000.
International Search Report—International Search Authority—PCT/US03/39497—May 25, 2004.

* cited by examiner

*Primary Examiner*—Edward Urban
*Assistant Examiner*—Raymond S. Dean
(74) *Attorney, Agent, or Firm*—Howard H. Seo; James K. O'Hare; Thomas R. Rouse (57) ABSTRACT

Techniques to detect for DTX frames in a "primary" transmission that may be sent in a non-continuous manner using a "secondary" transmission that is sent during periods of no transmission for the primary transmission. The primary and secondary transmissions may be the ones sent on the F-DCCH and Forward Power Control Subchannel, respectively, in an IS-2000 system. In one method, a determination is first made whether or not a frame received for the primary transmission in a particular frame interval is a good frame (e.g., based on CRC). If the received frame is not a good frame, then a determination is next made whether the received frame is a DTX frame or an erased frame based on a number of metrics determined for the primary and secondary transmissions. The metrics may include symbol error rate of the received frame, secondary transmission (e.g., PC bit) energy, and received frame energy.

22 Claims, 6 Drawing Sheets

DISCONTINUOUS TRANSMISSION (DTX) DETECTION IN WIRELESS COMMUNICATION SYSTEMS

BACKGROUND

1. Field

The present invention relates generally to communication, and more specifically to techniques for detecting discontinuous transmission (DTX) frames in wireless communication systems.

2. Background

Wireless communication systems are widely deployed to provide various types of communication. These systems may be multiple-access systems capable of supporting communication with multiple users by sharing the available system resources. Examples of such multiple-access systems include code division multiple access (CDMA) systems, time division multiple access (TDMA) systems, and frequency division multiple access (FDMA) systems. A CDMA system may be designed to implement one or more standards such as IS-2000, W-CDMA, IS-856, IS-95, and so on.

Many newer generation wireless communication systems, such as IS-2000 and W-CDMA systems, support flexible operation. For example, data may be transmitted at any one of a number of supported rates on the forward and reverse channels. Moreover, a forward channel may be operated in a non-continuous manner whereby data frames may not be transmitted some or most of the time. This non-continuous transmission is also referred to as discontinuous transmission (DTX). For IS-2000 and W-CDMA systems, no data frames are actually transmitted on the forward channel during periods of no transmission, and these non-transmitted frames are often referred to as DTX frames.

For certain functions, it is necessary to accurately detect what type of frame was received in each frame interval. For example, in an IS-2000 system, a base station is allowed to discontinue its transmission on a Forward Dedicated Control Channel (F-DCCH) when it has no data to send to a terminal (e.g., a cellular phone). The F-DCCH may be configured to carry a Forward Power Control Subchannel, which includes power control (PC) bits for the terminal. The PC bits are transmitted on the F-DCCH even during periods of no data transmission. If the Forward Power Control Subchannel is carried on the F-DCCH, then the terminal would need to determine whether a good, bad (erased), or DTX frame was received in each frame interval. This information is needed to properly control the transmit power of the F-DCCH, so that the PC bits for the Forward Power Control Subchannel can be correctly detected by the terminal even during periods of no data transmission.

The determination of whether or not a received frame is a good frame is typically trivial, and may be made based on a cyclic redundancy check (CRC) value included in each transmitted data frame. However, the determination of whether the received frame is erased or DTX (if the CRC fails) is more challenging. This is because a failed CRC can result from a data frame being transmitted but received in error (i.e., an erased frame), or no data frame being transmitted (i.e., a DTX frame). Some other metrics besides the CRC would then be needed to detect for DTX frames.

There is therefore a need in the art for techniques to accurately detect DTX frames on a forward channel in wireless (e.g., IS-2000 and W-CDMA) communication systems.

SUMMARY

Techniques are provided herein to detect for DTX frames in a "primary" transmission that may be sent in a non-continuous manner. A "secondary" transmission that is sent even during periods of no transmission for the primary transmission is used to detect for DTX frames in the primary transmission. For an IS-2000 system, the primary transmission may be the data transmission on the Forward Fundamental Channel (F-FCH) or the F-DCCH, and the secondary transmission may be the PC bit transmission on the Forward Power Control Subchannel that is carried on the F-FCH or F-DCCH.

In an embodiment, a method is provided for detecting DTX frames in a wireless (e.g., IS-2000 or W-CDMA) communication system. In accordance with the method, a determination is first made whether or not a frame received for the primary transmission in a particular frame interval is a good frame (e.g., based on a CRC value included in each transmitted frame). If the received frame is not a good frame, then a determination is next made whether the received frame is a DTX frame or an erased frame based on a number of metrics determined for the primary and secondary transmissions received during the particular frame interval.

The metrics may include (1) the symbol error rate (SER) of re-encoded symbols for the received frame, (2) the energy of the secondary transmission received during the particular frame interval (e.g., PC bit energy), and (3) the energy of the received frame for the primary transmission. For simplicity, a combined metric may be computed based on all three metrics (i.e., the SER, PC bit energy, and frame energy) and used to determine the received frame type (i.e., erased or DTX).

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
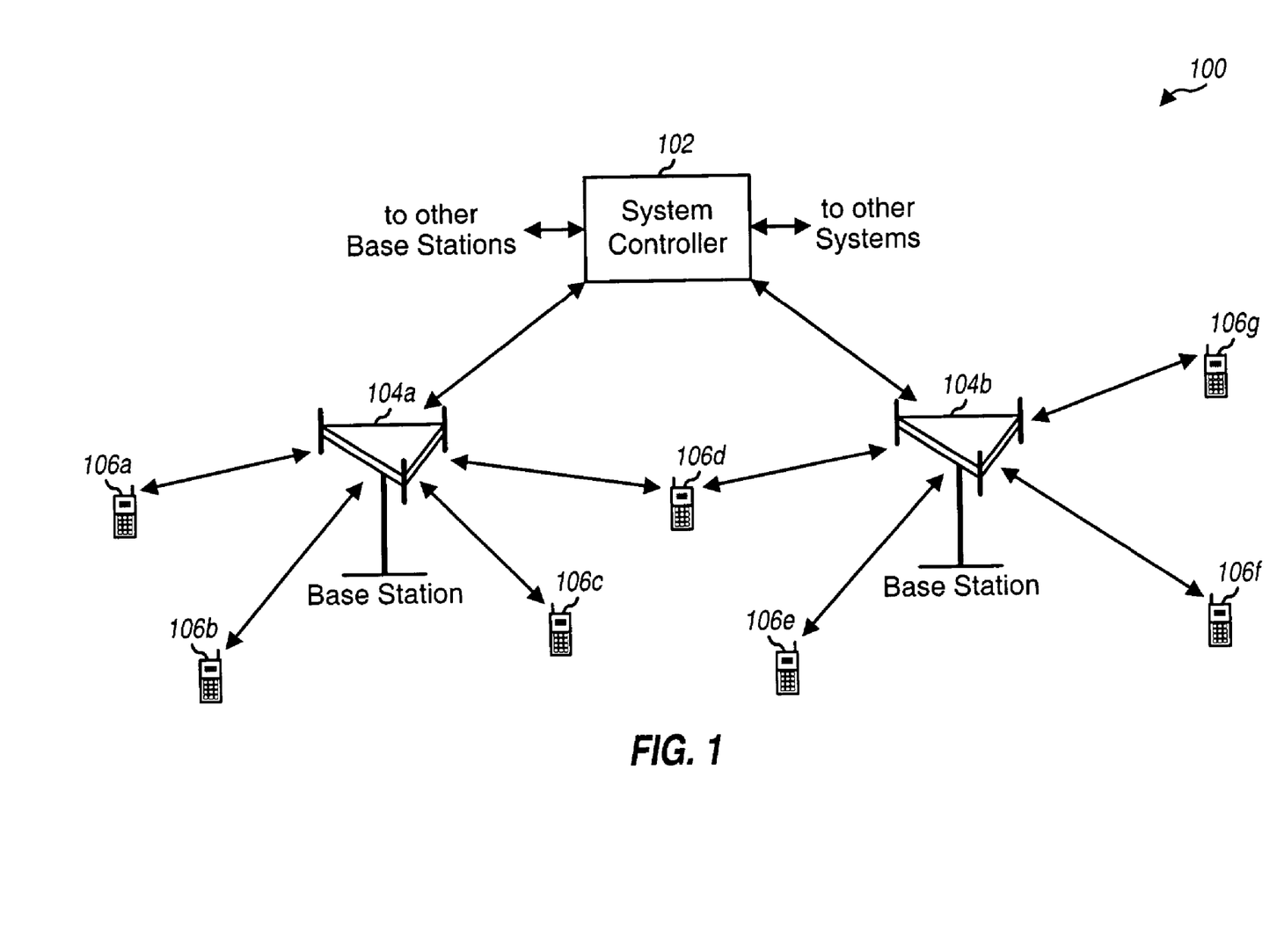
FIG. 1 illustrates a wireless communication system.

FIG. 1 is a diagram of a wireless communication system 100. System 100 includes a number of base stations 104 that communicate with a number of terminals 106. A base station is a fixed station used for communicating with the terminals and may also be referred to as a base transceiver system (BTS), a Node B, an access point, or some other terminology. A terminal may also be referred to as a mobile station, a remote station, an access terminal, a user equipment (UE), or some other terminology. Each terminal may communicate with one or multiple base stations on the forward link and/or reverse link at any given moment. This depends on whether or not the terminal is active, whether or not soft handoff is supported for data transmission, and whether or not the terminal is in soft handoff.

A system controller 102 couples to base stations 104 and may further couple to a public switched telephone network (PSTN) and/or a packet data network (PDN). System controller 102 may also be referred to as a base station controller (BSC), a mobile switching center (MSC), a radio network controller (RNC), or some other terminology. System controller 102 provides coordination and control for the base stations coupled to it. Via the base stations, system controller 102 further controls the routing of calls (1) among the terminals, and (2) between the terminals and other users and entities coupled to the PSTN (e.g., conventional telephones) and PDN.

The techniques described herein for detecting DTX frames may be implemented in various wireless communication systems. Thus, system 100 may be a CDMA system, a TDMA system, or some other type of system. A CDMA system may be designed to implement one or more standards such as IS-2000, IS-856, W-CDMA, IS-95, and so on. A TDMA system may be designed to implement one or more standards such as Global System for Mobile Communications (GSM). These standards are well known in the art and incorporated herein by reference. For clarity, the DTX frame detection techniques are described specifically for a cdma2000 system that implements IS-2000.

On the forward link, the capacity of each base station is limited by its total transmit power, subject to the availability of physical channel resources. Each base station may transmit data to a number of terminals concurrently on the same frequency band. A portion of the base station's total transmit power is then allocated to each active terminal such that the aggregate power allocated to all terminals is less than or equal to the total transmit power. To maximize forward link capacity while providing the desired level of performance for each active terminal, the transmit power for each user-specific transmission from the base station may be controlled to be as low as possible.

On the reverse link, a base station may receive signals transmitted from a number of terminals. The received signal from each terminal acts as interference to the received signals from all other terminals. To maximize reverse link capacity, the transmit power of each active terminal may also be controlled to be as low as possible.

A forward link power control loop is typically used to adjust the transmit power for the user-specific transmission sent to each terminal such that the received signal quality at the terminal is maintained at a particular target signal-to-noise-and-interference ratio (SNR), which is often referred to as the setpoint. A reverse link power control loop is also typically used to adjust the transmit power of each terminal such that the received signal quality at the base station is maintained at another setpoint, which may or may not be the same as the setpoint used for the forward link. The forward and reverse link power control loops are operated independently. Each power control loop requires a feedback stream from the receiver (typically in the form of power control (PC) bits or PC commands), which is used by the transmitter to adjust its transmit power for the transmission sent to the receiver.

In an IS-2000 system, a terminal may be assigned an F-FCH and/or an F-DCCH for data transmission on the forward link. The F-FCH is used to send data to the terminal. The F-DCCH is typically used to send control data for the F-FCH. The F-FCH or F-DCCH may also be configured to carry the Forward Power Control Subchannel.

Figure 2:
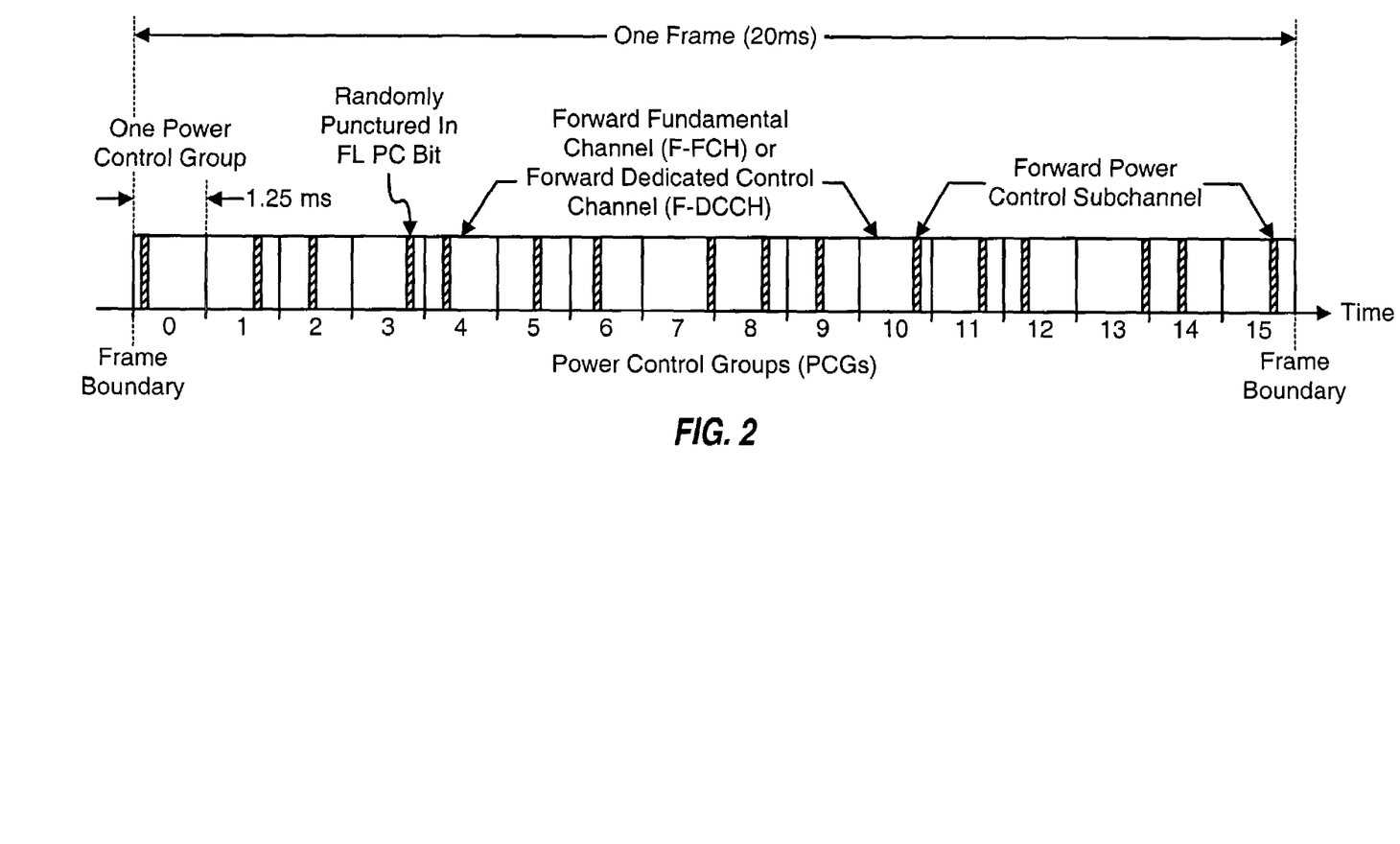
FIG. 2 illustrates the F-FCH, F-DCCH, and Forward Power Control Subchannel defined by IS-2000.

FIG. 2 is a diagram illustrating the F-FCH, F-DCCH, and Forward Power Control Subchannel defined by IS-2000. The transmission timeline for the F-FCH and F-DCCH is partitioned into (20 msec) frame intervals. Each frame interval is further partitioned into 16 (1.25 msec) power control groups (PCGs), which are numbered from 0 through 15. Data may be transmitted in 5 msec or 20 msec frames on the F-FCH and F-DCCH.

The Forward Power Control Subchannel may be transmitted on either the F-FCH or F-DCCH, which is dictated by the base station. The Forward Power Control Subchannel includes one PC bit for the reverse link power control loop (i.e., one FL PC bit) for each power control group. Each FL PC bit occupies $\frac{1}{12}$-th of a power control group and is pseudo-randomly located within the power control group. The remaining portion of each power control group is used to transmit data for the F-FCH or F-DCCH. The FL PC bits are used to adjust the transmit power of the terminal.

If the F-FCH is configured to carry the Forward Power Control Subchannel, then each data frame transmitted on the F-FCH is detected and used to adjust the setpoint that controls the transmit power of the F-FCH and F-DCCH. Each data frame transmitted on the F-FCH includes a CRC value, and this CRC value can be used by the terminal to determine the status of the received frame. If the CRC passes, then the received frame is classified as a good frame (i.e., transmitted by the base station and received by the terminal without errors). Alternatively, if the CRC fails, then the received frame is classified as bad or erased (i.e., transmitted by the base station and received by the terminal with errors). The received frame status (e.g., good or erased) may be used by the forward link power control loop to control the transmit power of the F-FCH and F-DCCH.

The F-DCCH may be operated in a non-continuous manner. If the F-DCCH is configured to carry the Forward Power Control Subchannel, then FL PC bits are transmitted on the forward link even during periods of no data transmission on the F-DCCH. The transmit power for the forward link would still need to be properly controlled during periods of no data transmission so that the FL PC bits can be correctly detected by the terminal. This requires accurate determination of whether a good, erased, or DTX frame was received by the terminal for each frame interval.

Techniques are described herein to accurately detect for DTX frames when the forward channel(s) being monitored (e.g., the F-DCCH) is operated in a non-continuous manner. The CRC value included in each transmitted data frame may be used to determine whether or not a received frame is good. However, the CRC cannot be used to determine whether a received frame is an erased frame or a DTX frame. Other metrics (described below) are used instead to make this determination. The techniques described herein can provide accurate detection of DTX frames (i.e., with low probability of false detection), which is highly desirable. False detection results from declaring a received frame as being an erased frame when it is actually a DTX frame, or declaring the received frame as being a DTX frame when it is actually an erased frame.

Figure 3:
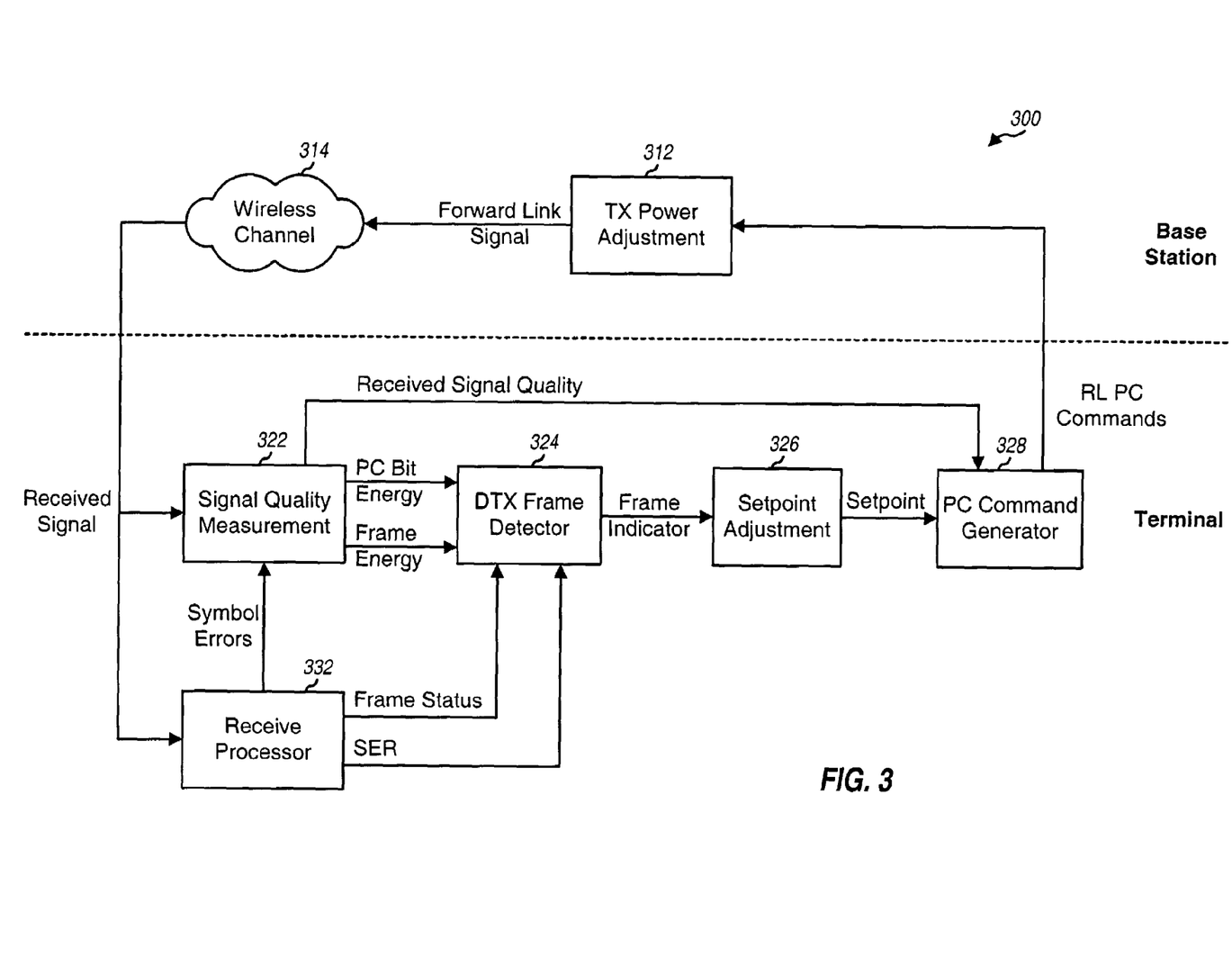
FIG. 3 illustrates the detection of received frames at a terminal.

FIG. 3 is a diagram illustrating the detection of received frames at a terminal. FIG. 3 also shows the generation of reverse link (RL) PC commands based on the detected frames. The RL PC commands are used to adjust the transmit power of the forward link transmission to the terminal.

The base station generates and transmits a forward link signal to the terminal. This forward link signal includes user-specific traffic and control data (if available) and FL PC bits, overhead data and signaling, and so on, all of which are carried on their designated forward channels/subchannels. For a cdma2000 system, the user-specific traffic and control data may be transmitted in (5 or 20 msec) data frames on the F-FCH and/or F-DCCH, a pilot is transmitted on a Forward Pilot Channel (F-PICH), and the FL PC bits are transmitted on the Forward-Power Control Subchannel. Since the pilot is intended to be received by all terminals in the coverage area of the base station, the transmit power for the F-PICH is typically fixed at a particular power level. However, the traffic and control data on the F-FCH and F-DCCH are user-specific, and the transmit power for these forward channels can be individually adjusted for each terminal (block 312).

The forward link signal is transmitted over a wireless channel (cloud 314) to the terminal. Due to path loss in the wireless channel, which typically varies over time and especially for a mobile terminal, the quality of the signal received by the terminal continually fluctuates.

At the terminal, the received signal is processed by a signal quality measurement unit 322 to determine the energy of each received frame and the energy of the FL PC bits for each frame interval. The frame energy may be computed in various manners and may take into account symbol errors in the received frame, as described below. Unit 322 provides the PC bit energy and frame energy to a DTX frame detector 324.

A receive processor 332 also processes the received signal to detect and recover each frame received on the F-FCH and F-DCCH. Receive processor 332 demodulates data samples (which are derived by digitizing the received signal) to obtain recovered symbols, decodes the recovered symbols for each received frame to obtain decoded bits, and further checks each decoded frame based on its CRC value to determine the status of the frame (i.e., good or not good). For DTX frame detection, receive processor 332 also re-encodes the decoded bits for each received frame to obtain re-encoded code symbols, compares the re-encoded symbols against the recovered symbols, and determines symbol errors and a symbol error rate (SER) for the received frame. Receive processor 332 provides the frame status (i.e., good or not good) and the SER for each received frame to DTX frame detector 324. Receive processor 332 may also provide indications of symbol errors to signal quality measurement unit 322, which may use this information in determining the frame energy.

DTX frame detector 324 receives various metrics including the PC bit energy and frame energy from unit 322 and the frame status and SER from receive processor 332. DTX frame detector 324 then determines whether each received frame is good, erased, or DTX based on these metrics. The detection for DTX frames is described in detail below. DTX frame detector 324 then provides a frame indicator (i.e., good, erased, or DTX) for each received frame to a setpoint adjustment unit 326, which updates the setpoint based on the frame indicator and provides the current setpoint to a PC command generator 328.

PC command generator 328 receives the setpoint from setpoint adjustment unit 326 and possibly other metrics (e.g., the received signal quality from unit 322). Generator 328 then derives PC commands for the reverse link power control loop. These RL PC commands are sent back to the base station on a Reverse Power Control Subchannel and used to adjust the transmit power for the F-FCH and F-DCCH. This ensures that the FL PC bits can be correctly detected by the terminal even when there is no data transmission on the F-DCCH.

The detection of DTX frames may be performed based on various metrics. One such metric is the SER. An example conventional DTX detection algorithm that uses only the CRC and SER may be expressed in pseudo-code, as follows:

```
if CRC == 'pass'
    Frame indicator = 'Good"
else if SER > SER_threshold
    Frame indicator = 'DTX'
else
    Frame indicator = 'Erasure'
```

Figure 4:
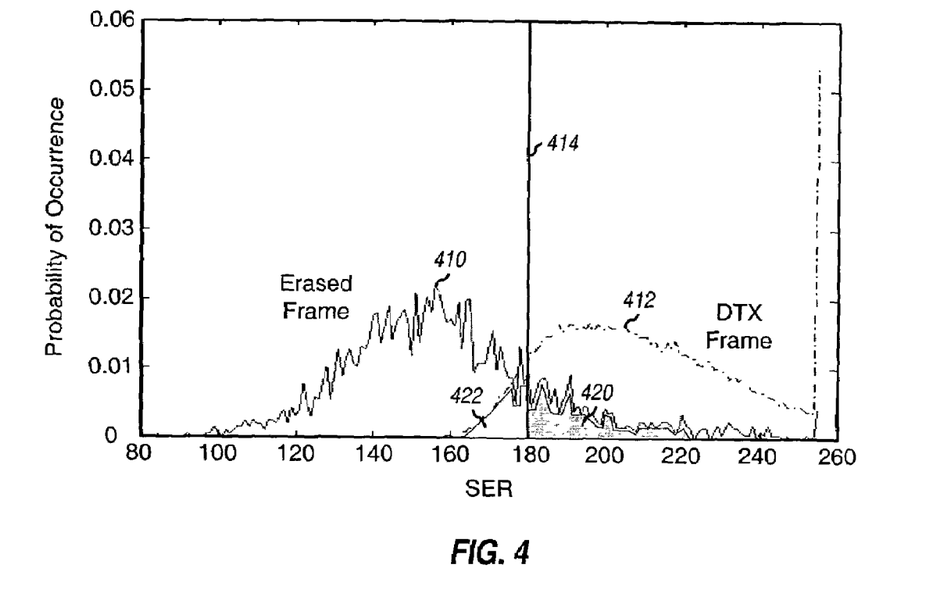
FIG. 4 shows probability density functions (PDFs) of SERs for erased and DTX frames.

FIG. 4 shows probability density functions (PDFs) of the SERs for erased frames and DTX frames. The left vertical axis represents probability of occurrence, and the horizontal axis represents SERs. The probability of obtaining any given SER for erased frames is given by a plot 410, which is the PDF of the SERs for erased frames. Similarly, the probability of obtaining any given SER for DTX frames is given by a plot 412, which is the PDF of the SERs for DTX frames.

The SER_threshold used to detect DTX frames may be represented by a vertical line 414 at a particular SER value. For the above algorithm, a received frame would be detected as a DTX frame if the SER for the frame is greater than the SER_threshold, and detected as an erased frame otherwise (assuming that the CRC fails).

As shown in FIG. 4, the PDFs for the erased and DTX frames overlap. Thus, regardless of which SER value is used for the SER_threshold, there will be detection error. The probability of detection error (or false detection) from erasure-to-DTX is given by shaded area 420, which is to the right of line 414 and under plot 410. The probability of detection error from DTX-to-erasure is given by area 422, which is to the left of line 414 and under plot 412. A tradeoff can be made between the erasure-to-DTX probability and the DTX-to-erasure probability by adjusting the SER_threshold. However, as may be visualized from the plots in FIG. 4, if the erasure-to-DTX probability is to be kept under 10 percent, then the DTX-to-erasure probability may be quite high (e.g., up to 50 percent under certain operating scenarios).

In an embodiment, the detection of DTX frames is performed based on three metrics—SER, PC bit energy, and frame energy. As described above for FIG. 4, SER alone is insufficient to provide accurate detection of DTX frames. However, if a secondary transmission is available for the DTX frames, such as the FL PC bits on the F-FCH or F-DCCH, then the energy of this secondary transmission may be used along with the SER to more accurately detect for DTX frames. The PC bit energy is normalized by dividing it by the frame energy.

Figure 5:
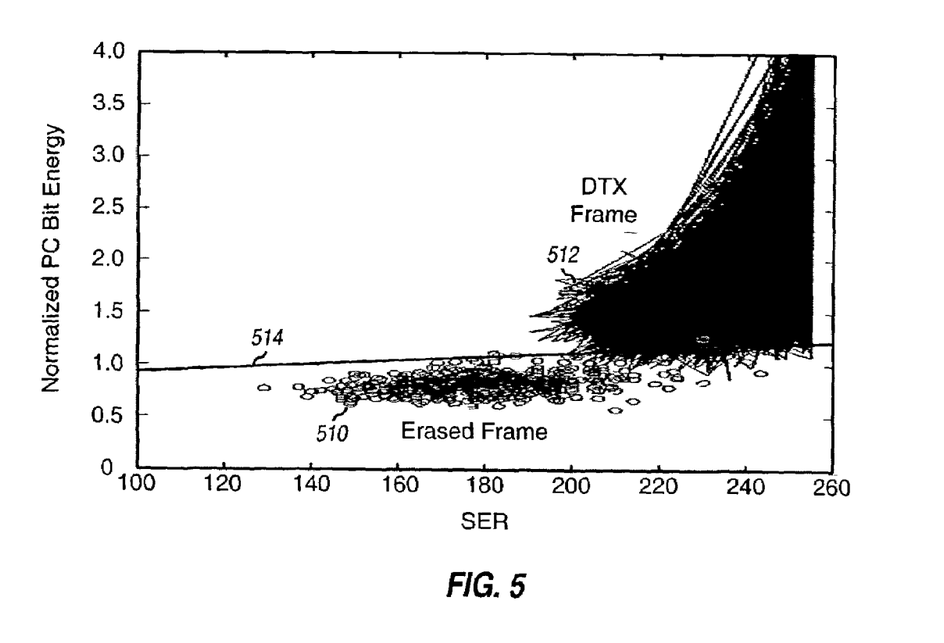
FIG. 5 shows distributions of erased and DTX frames when plotted by SER versus normalized PC bit energy.

FIG. 5 shows the distributions of erased and DTX frames when plotted by SER versus "normalized" PC bit energy. The normalized PC bit energy is equal to the PC bit energy divided by the frame energy. The horizontal axis represents SERs, and the vertical axis represents normalized PC bit energies.

The SERs and normalized PC bit energies are determined for a number of erased frames and, when plotted, result in a distribution 510. Similarly, the SERs and normalized PC bit energies are determined for a number of DTX frames and, when plotted, result in a distribution 512.

As shown in FIG. 5, the distribution of erased frames, when plotted using these metrics, overlaps very little with the distribution of DTX frames. The energy of a DTX frame tends to be smaller for a given transmit power level for the F-FCH and F-DCCH, which then results in larger normalized PC bit energy for the DTX frame. Conversely, the energy of an erased frame tends to be larger for the same transmit power level for the F-FCH and F-DCCH, which then results in smaller normalized PC bit energy for the erased frame. Thus, the distributions for the erased and DTX frames are separated from each other when plotted using these metrics.

A threshold line 514 may be defined for use to determine whether a given received frame is an erased or DTX frame. An erased frame is declared if the SER and normalized PC bit energy for the received frame map to a point that is below threshold line 514, and a DTX frame is declared otherwise.

The erased and DTX frame distributions shown in FIG. 5 are for a specific operating scenario, which is defined by the following parameters: Radio Configuration (RC) 3 in IS-2000, additive white Gaussian noise (AWGN) channel, 2-path (i.e., two propagation paths for the transmitted signal), power control ON, 1 percent frame error rate (FER), and geometry (G)=3 dB. Different operating scenarios may be associated with different sets of erased and DTX frame distributions.

Figure 6:
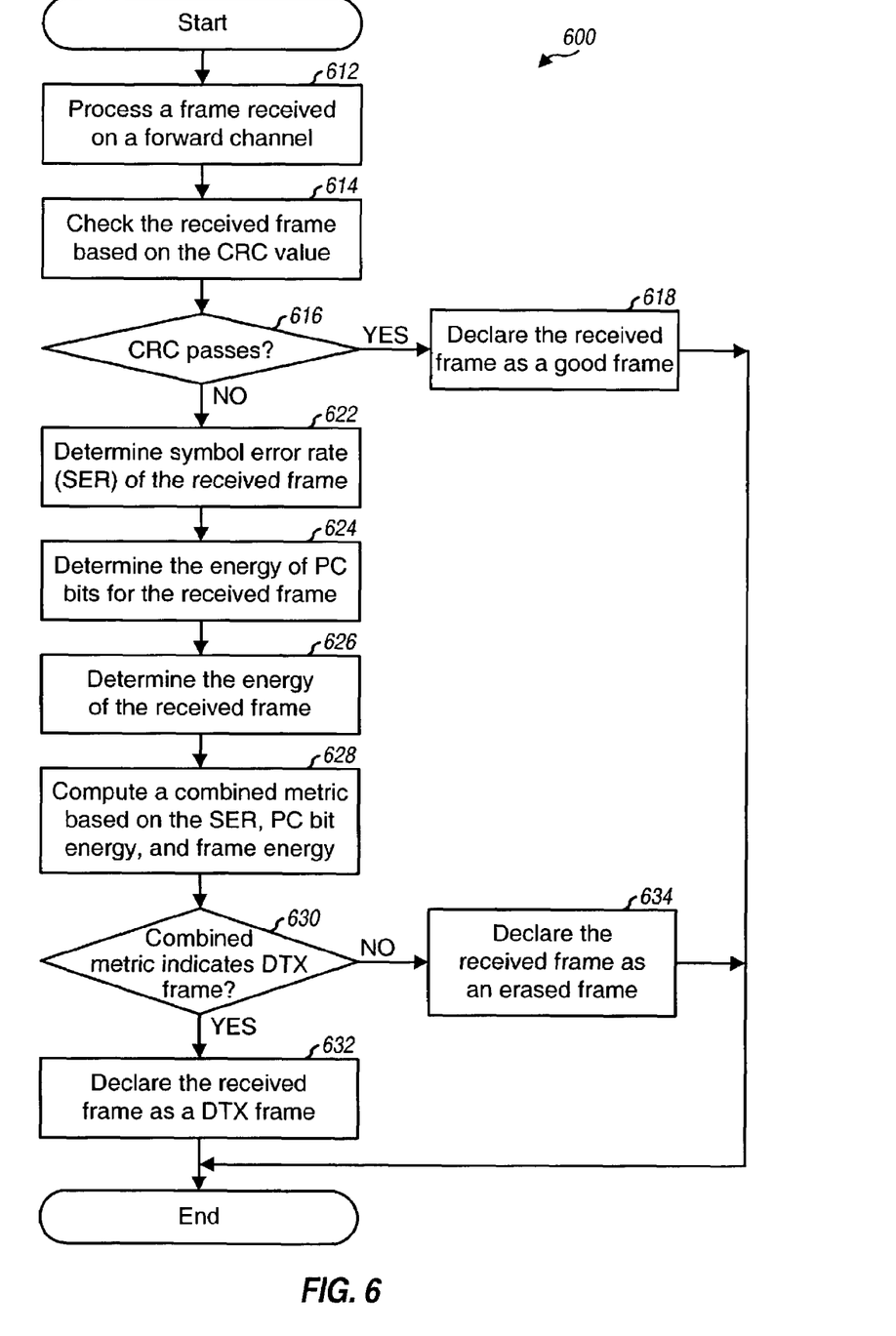
FIG. 6 is a flow diagram of a process for detecting DTX frames for a non-continuous transmission on a forward channel.

FIG. 6 is a flow diagram of an embodiment of a process 600 for detecting DTX frames for a non-continuous transmission on a forward channel. For this flow diagram, it is assumed that the forward channel is the F-DCCH, which is configured to carry the Forward Power Control Subchannel. Process 600 is performed for each received frame to determine its type (i.e., good, erased, or DTX).

For each frame interval, the F-DCCH is processed to attempt to recover a data frame that may have been transmitted in the frame interval (step 612). The F-DCCH processing typically includes demodulation and decoding, and may be performed in a manner known in the art. The result of step 612 is a sequence of decoded bits for the received frame. The received frame is then checked based on a CRC value for the frame (step 614).

A determination is then made whether or not the CRC passes (step 616). If the answer is yes, then the received frame is declared as a good frame (step 618), and the process terminates.

Otherwise, if the CRC fails in step 616, then the SER of the received frame is determined (step 622). This may be achieved by re-encoding the decoded bits and comparing the re-encoded symbols against the recovered symbols. Since the re-encoded symbols are binary values and the recovered symbols are typically soft decisions (i.e., multi-bit values), the symbol error detection may be performed by comparing each re-encoded symbol with the polarity of the corresponding recovered symbol to determine whether or not there is a symbol error. The SER is then equal to the number of symbol errors divided by the total number of recovered symbols for the received frame. Since a division is normally difficult to perform, the SER may be given by the total number of symbol errors in the received frame for a given frame size.

The FL PC bits received for the frame interval are also processed, and the energy of these PC bits is determined (step 624). The PC bit energy may be computed by (1) summing the squares of the inphase (I) and quadrature (Q) components for each PC bit, and (2) accumulating the summed values for the 16 PC bits in the frame interval.

The energy of the received frame is also determined (step 626). The frame energy may be computed in various manners. In one embodiment, the frame energy is computed by (1) determining the energy of each recovered symbol in the received frame as the sum of the squares of the I and Q components for the recovered symbol, and (2) accumulating the energies of all recovered symbols (i.e., except for the PC bits). In a second embodiment, the frame energy is computed by (1) determining the energy of each recovered symbol in the received frame, (2) accumulating the energies of all good recovered symbols (i.e., those with the same polarity as their corresponding re-encoded symbols), (3) accumulating the energies of all bad recovered symbols (i.e., those with opposite polarity as their corresponding re-encoded symbols, which are symbol errors), and (4) subtracting the bad recovered symbol energy from the good recovered symbol energy to obtain the frame energy. The frame energy determined in this manner is also referred to as the "decoded frame energy". (The frame energy used for FIG. 5 is determined using the second embodiment.) In general, the PC bit energy and frame energy may be computed using various techniques, including those described in the U.S. Pat. Nos. 5,056,109 and 5,265,119. Steps 622, 624, and 626 may be performed (e.g., by units 322 and 332 in FIG. 3) for a received frame only if the CRC fails.

The determination of whether the received frame is erased or DTX is then made based on the SER, PC bit energy, and frame energy. This may be achieved visually by plotting the SER and normalized PC bit energy (i.e., PC bit energy/frame energy) for the received frame (e.g., as shown in FIG. 5) and determining whether or not the plotted point falls above or below the threshold line (e.g., line 514 in FIG. 5).

However, for simplicity, a combined metric is computed based on the SER, PC bit energy, and frame energy (step 628), as follows:

$$\text{Combined metric} = SER - \text{Slope} * \frac{PC \text{ Bit Energy}}{\text{Frame Energy}} + \text{Intercept}, \quad \text{Eq (1)}$$

where Slope is the slope of the threshold line used to demarcate (or separate) the erased frames from the DTX frames, and Intercept is the SER value for the threshold line with the normalized PC bit energy set equal to zero (0.0). The slope is equal to $\Delta SER/\Delta$Normalized PC Bit Energy.

For threshold line 514 in FIG. 5, equation (1) may be expressed as:

$$\text{Combined metric} = SER - 520 * \frac{PC \text{ Bit Energy}}{\text{Frame Energy}} + 380, \quad \text{Eq (2)}$$

where the Slope is equal to 520 and the Intercept is equal to −380 (e.g., SER is equal to 140 when the normalized PC bit energy is equal to 1.0).

The values for Slope and Intercept are dependent on the specific threshold line used to demarcate the erased frames from the DTX frames, which may in turn be dependent on the distributions of erased and DTX frames using the defined metrics. As noted above, different distributions may be obtained for different operating scenarios, in which case different threshold lines with different sets of Slope and Intercept values may be used for different operating scenarios. The Slope and Intercept values may be determined statically at the start of operation or they may be dynamically determined and assigned (e.g., at a specified update rate). The Slope and Intercept values may be dynamically determined based on various factors such as current estimates of the SER, frame energy, PC bit energy, CRC, and so on. The dynamic assignment of the Slope and Intercept values may provide improved performance under dynamically changing channel conditions.

The threshold line may also be defined based on a higher-order function or a non-linear function instead of a linear function as shown in equations (1) and (2). For example, the threshold line may be defined based on a quadratic function.

A determination is then made whether or not the combined metric indicates a DTX frame (step 630). This would be the case if the combined metric computed based on equation (1) or (2) is less than 0. As an example, if the SER is equal to 220 and the normalized PC bit energy is equal to 2.0, then the combined metric computed by equation (2) would be −440 and would indicate a DTX frame. As another example, if the SER is equal to 180 and the normalized PC bit energy is equal to 0.8, then the combined metric from equation (2) would be 144 and would indicate an erased frame. If the answer for step 630 is yes, then the received frame is declared as a DTX frame (step 632). Otherwise, the received frame is declared as an erased frame (step 634). In either case, the process then terminates.

The detection of DTX frames based on SER, PC bit energy, and frame energy may be expressed in pseudo-code, as follows:

```
if CRC =='pass'
    Frame indicator = 'Good"
else if SER < 520*PC Bit Energy/Frame Energy - 380
    Frame indicator = 'DTX'
else
    Frame indicator = 'Erasure'
```

Again, other values may be used for the slope and intercept for other operating scenarios.

The innovative DTX detection algorithm, which uses SER, PC bit energy, and frame energy, was simulated for various operating scenarios. The simulation shows that this DTX detection algorithm can provide superior performance over the conventional algorithm that uses only SER. In particular, the innovative DTX detection algorithm can provide DTX-to-erasure false detection probability on the order of 1 percent for most cases, and erasure-to-DTX false detection probability also on the order of 1 percent.

Figure 7:
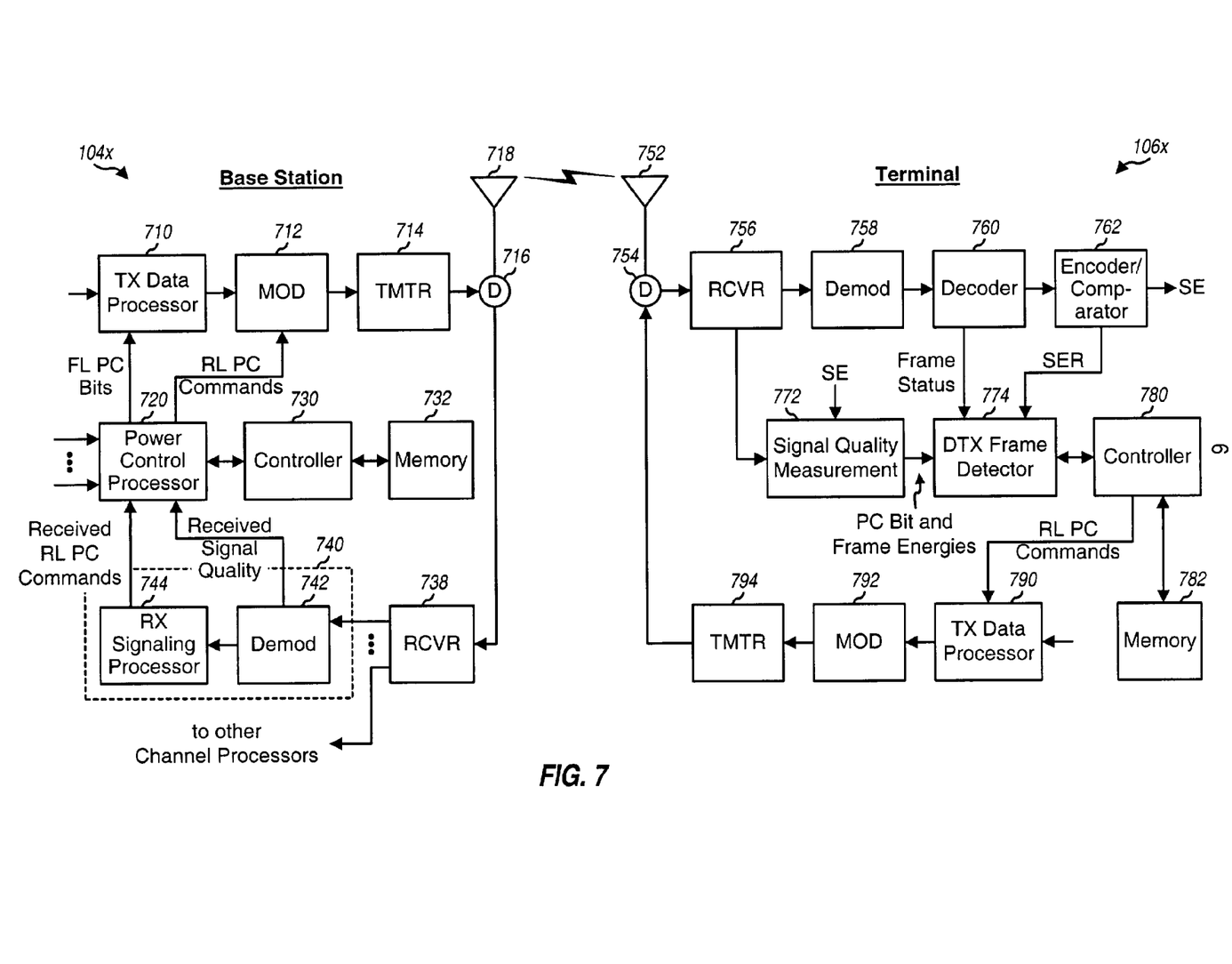
FIG. 7 is a block diagram of a base station and a terminal in the wireless communication system.

FIG. 7 is a block diagram of an embodiment of a base station 104x and a terminal 106x. On the forward link, a transmit (TX) data processor 710 receives data of various types and processes (e.g., formats, encodes, and interleaves) the received data. The processed data is provided to a modulator (MOD) 712 and further processed (e.g., channelized with one or more channelization codes, spectrally spread with a pseudo-random noise (PN) sequence, and so on). The modulated data is then provided to a transmitter unit (TMTR) 714 and conditioned (e.g., converted to one or more analog signals, amplified, filtered, frequency upconverted, and so on) to generate a forward link signal. The forward link signal is routed through a duplexer (D) 716 and transmitted via an antenna 718 to the terminals.

Although not shown in FIG. 7 for simplicity, base station 104x is capable of processing and transmitting data and signaling on one or more forward channels/subchannels (e.g., the F-FCH, F-DCCH, Forward Power Control Subchannel, and so on) to a particular terminal. The processing (e.g., encoding and modulation) for each forward channel/subchannel may be different from that of other forward channels/subchannels.

At terminal 106x, the forward link signal is received by an antenna 752, routed through a duplexer 754, and provided to a receiver unit (RCVR) 756. Receiver unit 756 conditions (e.g., filters, amplifies, and frequency downconverts) the received signal and further digitizes the conditioned signal to provide data samples. A demodulator (Demod) 758 further processes (e.g., despreads, channelizes, and data demodulates) the data samples to provide recovered symbols (i.e., demodulated data). Demodulator 758 may implement a rake receiver that can process multiple signal instances in the received signal.

A decoder 760 then deinterleaves and decodes the recovered symbols to provide decoded bits, and further checks each received frame to determine the status of the frame. The frame status indicates whether or not a good frame was received for each frame interval and is provided to a DTX frame detector 774. An encoder/comparator 762 re-encodes the decoded bits for each received frame to obtain re-encoded symbols, and compares the re-encoded symbols against the recovered symbols to determine symbol errors (SE) and the SER of each frame. The SER is provided to DTX frame detector 774, and the indication of symbol errors may be provided to unit 772 and used to determine the frame energy.

For the detection of DTX frames, the data samples from receiver unit 756 are also provided to a signal quality measurement unit 772, which determines the energy of the PC bits received on the Forward Power Control Subchannel and the energy of each received frame. The frame energy may be computed in a manner that takes into account good and bad recovered symbols (i.e., symbol errors), as described above. The PC bit and frame energies are provided to DTX frame detector 774.

For each received frame that is not a good frame, DTX frame detector 774 determines whether the frame is an erased frame or a DTX frame based on the SER, PC bit energy, and frame energy, as described above. DTX frame detector 774 can implement the process shown in FIG. 6 to detect for DTX frames. DTX frame detector 774 provides the frame indicator (good, erased, or DTX) for each received frame to controller 780, which may then generate RL PC commands used to adjust the transmit power of the forward channel.

On the reverse link, a TX data processor 790 receives and processes (e.g., formats, encodes) various types of data. A modulator 792 receives and further processes (e.g., channelizes and spectrally spreads) the data from TX data processor 790. For IS-2000, the RL PC commands may be multiplexed with pilot data and transmitted on the Reverse Pilot Channel. The modulated data is then conditioned by a transmitter unit 794 to generate a reverse link signal, which is then routed through duplexer 754 and transmitted via antenna 752 to one or more base stations.

At base station 104x, the reverse link signal is received by antenna 718, routed through duplexer 716, and provided to a receiver unit 738. Receiver unit 738 conditions the received signal, digitizes the conditioned signal, and provides a sample stream to each channel processor 740. Each channel processor 740 includes a demodulator 742 and an RX signaling processor 744 that receive and process the sample stream for one terminal to recover the transmitted data and RL PC commands. A power control processor 720 receives the RL PC commands and adjusts the transmit power of the forward channel for the terminal (including the Forward Power Control Subchannel used to send FL PC bits) based on these RL PC commands. Power control processor 720 is also provided with the received signal quality for the reverse link signal from the terminal, and determines FL PC bits to be sent on the Forward Power Control Subchannel to the terminal.

Controllers 730 and 780 direct the operation of various processing units within the base station and terminal, respectively. Controller 780 may also be designed to perform various functions for DTX frame detection such as, for example, determining the PC bit energy and frame energy, computing the combined metric, determining whether the received frame is erased or DTX, and so on. Thus, controller 780 may be designed to implement unit 772 and/or detector 774. Memory units 732 and 782 may store data and program codes used by various processing units within the base station and terminal, respectively.

For clarity, various aspects and embodiments of the DTX frame detection have been specifically described for a cdma2000 system that implements IS-2000. In general, these techniques may be used to detect for DTX frames in a primary transmission that may be transmitted in a non-continuous manner. A secondary transmission that is transmitted during periods of no transmission for the primary transmission is then used to detect for DTX frames in the primary transmission. For a cdma2000 system, the primary transmission may be the one sent on the F-FCH or F-DCCH, and the secondary transmission may be the one sent on the Forward Power Control Subchannel. The secondary transmission may be any transmission having transmit power that is related to that of the primary transmission.

The detection of DTX frames may also be performed based on other combinations of metrics beside the specific combination described above which includes the SER, PC bit energy, and frame energy. For example, the DTX detection may be performed based on a combination of just SER and frame energy, a combination of SER and PC bit energy, and so on.

The techniques described herein may be used to detect for DTX frames on the reverse link as well as the forward link. These techniques may also be used for various wireless communication systems, such as IS-2000 and W-CDMA systems.

The DTX frame detection techniques described herein may be implemented by various means. For example, these techniques may be implemented in hardware, software, or a combination thereof. For a hardware implementation, the DTX frame detection may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the DTX frame detection may be implemented with modules (e.g., procedures, functions, and so on) that perform the functions described herein. The software codes may be stored in a memory unit (e.g., memory unit 782 in FIG. 7) and executed by a processor (e.g., controller 780). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for detecting discontinuous transmission (DTX) frames in a wireless communication system, comprising:

ascertaining whether a frame received for a primary transmission in a particular frame interval is a good frame or not a good frame based on an error detection code, a good frame being a correctly decoded frame;

if the received frame is a good frame with correctly decoded data, skipping DTX detection for the received frame; and if the received frame is not a good frame, performing DTX detection and determining whether the received frame is a DTX frame or an erased frame based on a plurality of metrics determined for the primary transmission and a secondary transmission received during the particular frame intervals, wherein the plurality of metrics include a symbol error rate (SER) of re-encoded symbols for the received frame, energy of the received frame, and energy of the secondary transmission received during the particular frame interval, and wherein the frame energy is computed as energy of good recovered symbols in the received frame minus energy of bad recovered symbols, wherein the good and bad recovered symbols correspond to no symbol errors and symbol errors, respectively.

2. The method of claim 1, wherein the secondary transmission comprises power control (PC) bits.

3. The method of claim 1, wherein the ascertaining is based on a cyclic redundancy check (CRC) value included in each transmitted frame for the primary transmission.

4. The method of claim 2, wherein the determining includes:

determining energy of the PC bits received during the particular frame interval, determining energy of the received frame, and determining SER of re-encoded symbols for the received frame, and wherein the received frame is determined to be a DTX frame or an erased frame based on the SER, the PC bit energy, and the frame energy.

5. The method of claim 4, wherein the determining further includes:

computing a combined metric based on the SER, the PC bit energy, and the frame energy, and wherein the received frame is determined to be a DTX frame or an erased frame based on the combined metric.

6. The method of claim 5, wherein the combined metric is expressed as:

$$\text{Combined metric} = SER - \text{Slope} * \frac{PC \text{ Bit Energy}}{\text{Frame Energy}} + \text{Intercept},$$

where Slope is a slope of a threshold line used to separate distribution of erased frames from distribution of DTX frames, and Intercept is an SER value for the threshold line with the ratio of PC bit energy to frame energy set to zero (0.0).

7. The method of claim 6, wherein values for Slope and Intercept are dependent on distributions of erased and DTX frames for a particular operating scenario.

8. The method of claim 1, wherein the determining is further based on a threshold line used to separate distribution of erased frames and distribution of DTX frames that are obtained based on the plurality of metrics.

9. The method of claim 8, wherein the threshold line is selected based on a particular operating scenario for the primary transmission.

10. The method of claim 8, wherein the threshold line is defined based on estimates of at least one metric indicative of current operation conditions.

11. The method of claim 10, wherein the threshold line is dynamically updated based on current estimates of the at least one metric.

12. The method of claim 10, wherein the at least one metric comprises SER of re-encoded symbols, PC bit energy, frame energy, frame status, or a combination thereof.

13. The method of claim 1, further comprising:
determining a power control command for adjusting transmit power of the secondary transmission based in part on whether the received frame is determined as a good, erased, or DTX frame.

14. The method of claim 1, wherein the secondary transmission is multiplexed with the primary transmission and sent even during periods of no transmission for the primary transmission.

15. The method of claim 1, wherein the wireless communication system is an IS-2000 or W-CDMA communication system.

16. The method of claim 1, wherein the primary transmission is sent on a Forward Dedicated Channel (F-FCH) or a Forward Dedicated Control Channel (F-DCCH) defined by IS-2000.

17. A method for detecting discontinuous transmission (DTX) frames in a CDMA communication system, comprising:
determining whether a received frame for a particular frame interval is a good frame or not a good frame based on a cyclic redundancy check (CRC) value, a good frame being a correctly decoded frame;
skipping DTX detection if the received frame is a good frame with correctly decoded data; and
performing DTX detection if the received frame is not a good frame, comprising:
determining energy of power control (PC) bits received during the particular frame interval,
determining energy of the received frame,
determining symbol error rate (SER) of re-encoded symbols for the received frame, and
determining whether the received frame is a DTX frame or an erased frame based on the SER, the PC bit energy, and the frame energy,
wherein the frame energy is computed as energy of good recovered symbols in the received frame minus energy of bad recovered symbols, wherein the good and bad recovered symbols correspond to no symbol errors and symbol errors, respectively.

18. The method of claim 17, wherein the received frame is for a Forward Fundamental Channel (F-FCH) or a Forward Dedicated Control Channel (F-DCCH) defined by IS-2000, and the PC bits are for a Forward Power Control Subchannel that is carried on the F-FCH or F-DCCH.

19. A receiver unit in a wireless communication system, comprising:
a decoder operative to determine whether a frame received for a primary transmission in a particular frame interval is a good frame or not a good frame based on an error detection code, a good frame being a correctly decoded frame;
a signal quality measurement unit operative to determine energy of the received frame and energy of a secondary transmission received during the particular frame interval;
an encoder operative to determine a symbol error rate (SER) of re-encoded symbols for the received frame; and
a frame detector operative to skip discontinuous transmission (DTX) detection if the received frame is a good frame with correctly decoded data, to perform DTX detection if the received frame is not a good frame, and for DTX detection, to determine whether the received frame is a DTX frame or an erased frame based on the SER, the frame energy, and the secondary transmission energy,
wherein the frame energy is computed as energy of good recovered symbols in the received frame minus energy of bad recovered symbols, wherein the good and bad recovered symbols correspond to no symbol errors and symbol errors, respectively.

20. The receiver unit of claim 19, wherein the secondary transmission comprises power control bits.

21. An apparatus in a wireless communication system, comprising:
means for determining whether a frame received for a primary transmission in a particular frame interval is a good frame or not a good frame based on an error detection code, a good frame being a correctly decoded frame;
means for skipping discontinuous transmission (DTX) detection if the received frame is a good frame with correctly decoded data; and
means for performing DTX detection if the received frame is not a good frame, comprising means for determining whether the received frame is a DTX frame or an erased frame based on a plurality of metrics determined for the primary transmission and a secondary transmission received during the particular frame interval,
wherein the frame energy is computed as energy of good recovered symbols in the received frame minus energy of bad recovered symbols, wherein the good and bad recovered symbols correspond to no symbol errors and symbol errors, respectively.

22. The apparatus of claim 21, wherein the means for determining whether the received frame is a DTX frame or an erased frame includes:
means for determining energy of PC bits received during the particular frame interval for the secondary transmission,
means for determining energy of the received frame, and means for determining SER of re-encoded symbols for the received frame, and wherein the SER, PC bit energy, and frame energy are used to determine whether the received frame is a DTX frame or an erased frame.

* * * * *